US012608818B1

(12) United States Patent
Estrada et al.

(10) Patent No.: US 12,608,818 B1
(45) Date of Patent: Apr. 21, 2026

(54) EDGE-DEPLOYED AUTOMATED TARGET RECOGNITION AND TRACKING SYSTEM WITH DISTRIBUTED PROCESSING ARCHITECTURE

(71) Applicant: GRVTY, Inc., Arlington, VA (US)

(72) Inventors: Adam Estrada, Reston, VA (US);
Casey Backes, Tysons, VA (US);
Kristen E. Mistysyn, Erie, CO (US);
Dave Rabrun, Rockville, MD (US);
Nicholas Stephens, Thornton, CO (US);
Kaleb Boyd, Flowery Branch, GA (US)

(73) Assignee: GRVTY, INC., Arlington, VA (US)

( * ) Notice: Subject to any disclaimer, the term of this patent is extended or adjusted under 35 U.S.C. 154(b) by 0 days.

(21) Appl. No.: 19/351,299

(22) Filed: Oct. 7, 2025

(51) Int. Cl.
*G06T 7/20* (2017.01)
*G06T 1/20* (2006.01)
(Continued)

(52) U.S. Cl.
CPC ................. *G06T 7/20* (2013.01); *G06T 1/20* (2013.01); *G06T 5/20* (2013.01); *G06T 7/70* (2017.01);
(Continued)

(58) Field of Classification Search
CPC .... G06T 7/20; G06T 1/20; G06T 5/20; G06T 7/70; G06V 20/52; G06V 2201/07
See application file for complete search history.

(56) References Cited

U.S. PATENT DOCUMENTS 11,423,785 B2 * 8/2022 Fridman .................. G08G 3/00
12,493,124 B2 * 12/2025 Muthuraman ........ G01S 19/258
(Continued)

FOREIGN PATENT DOCUMENTS

WO WO-2023220270 A1 * 11/2023 ............. G01C 15/00
WO WO-2024186246 A1 * 9/2024 ............. G01S 7/006

OTHER PUBLICATIONS

Carthel, Craig, et al. "Multi-target custody via distributed multiple-model multiple-hypothesis tracking." 2022 IEEE Aerospace Conference (AERO). IEEE, 2022. (Year: 2022).*

*Primary Examiner* — Utpal D Shah
(74) *Attorney, Agent, or Firm* — GALVIN PATENT LAW LLC; Brian R. Galvin; Alec L. Perry

(57) ABSTRACT

A system and method for edge-deployed automated target recognition with distributed processing architecture. The system processes satellite sensor data directly at the edge using coordinated services for object detection and tracking. Detection services identify objects with geodetic localization while tracking services maintain persistent tracks across multiple frames. A message broker enables asynchronous communication between components and manages data flow for both real-time streaming and historical queries. The architecture supports track custody transfer between distributed nodes, allowing continuous object tracking across multiple satellite systems. This edge-based approach eliminates cloud processing dependencies and reduces latency from minutes to seconds. The system's distributed design enables autonomous operation at the sensor edge while maintaining coordination capabilities with other nodes, making it suitable for time-sensitive applications requiring real-time object recognition and tracking.

20 Claims, 10 Drawing Sheets

(51) Int. Cl.

| | | |
|---|---|---|
| *G06T 5/20* | (2006.01) | |
| *G06T 7/70* | (2017.01) | |
| *G06V 20/52* | (2022.01) | |

(52) U.S. Cl.

CPC .......... *G06V 20/52* (2022.01); *G06V 2201/07* (2022.01)

(56) References Cited

U.S. PATENT DOCUMENTS

| | | | |
|---|---|---|---|
| 2017/0053155 A1* | 2/2017 | Campbell | ............... G06F 16/29 |
| 2017/0061249 A1* | 3/2017 | Estrada | ................ G06V 10/454 |
| 2017/0300759 A1* | 10/2017 | Beard | ................... H04N 23/683 |
| 2020/0266883 A1* | 8/2020 | Pham | ..................... H04L 47/20 |
| 2021/0036772 A1* | 2/2021 | Miranda | ................... G06T 7/30 |
| 2022/0271824 A1* | 8/2022 | Blumenthal | ......... H04B 7/0691 |
| 2024/0312046 A1* | 9/2024 | Fichman | ................ G06V 20/52 |
| 2025/0131827 A1* | 4/2025 | Motamedi | ............. G07C 5/008 |
| 2025/0165907 A1* | 5/2025 | Roberts | ............. G06Q 10/0833 |

* cited by examiner

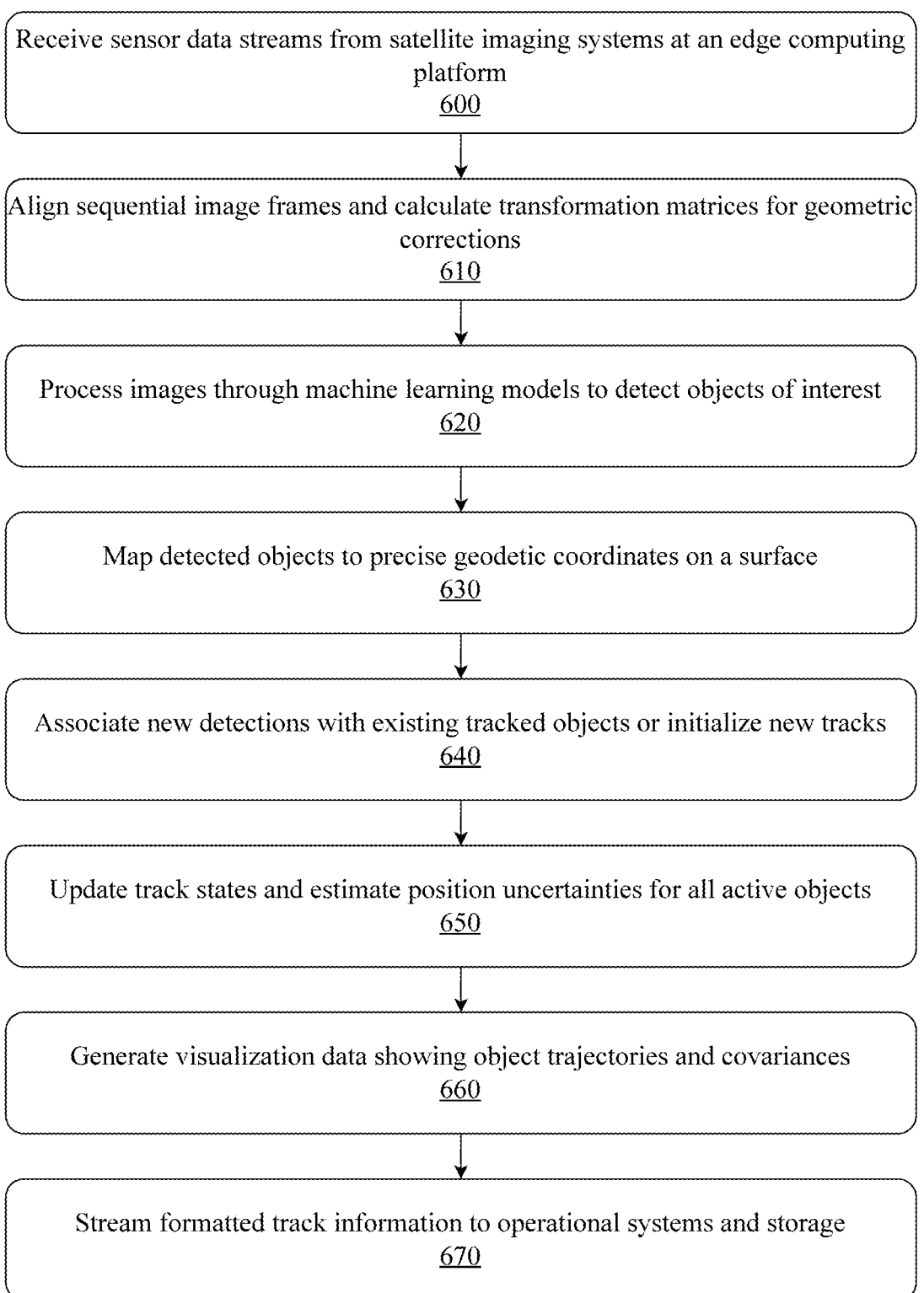

Receive sensor data streams from satellite imaging systems at an edge computing platform
600

Align sequential image frames and calculate transformation matrices for geometric corrections
610

Process images through machine learning models to detect objects of interest
620

Map detected objects to precise geodetic coordinates on a surface
630

Associate new detections with existing tracked objects or initialize new tracks
640

Update track states and estimate position uncertainties for all active objects
650

Generate visualization data showing object trajectories and covariances
660

Stream formatted track information to operational systems and storage
670

FIG. 6

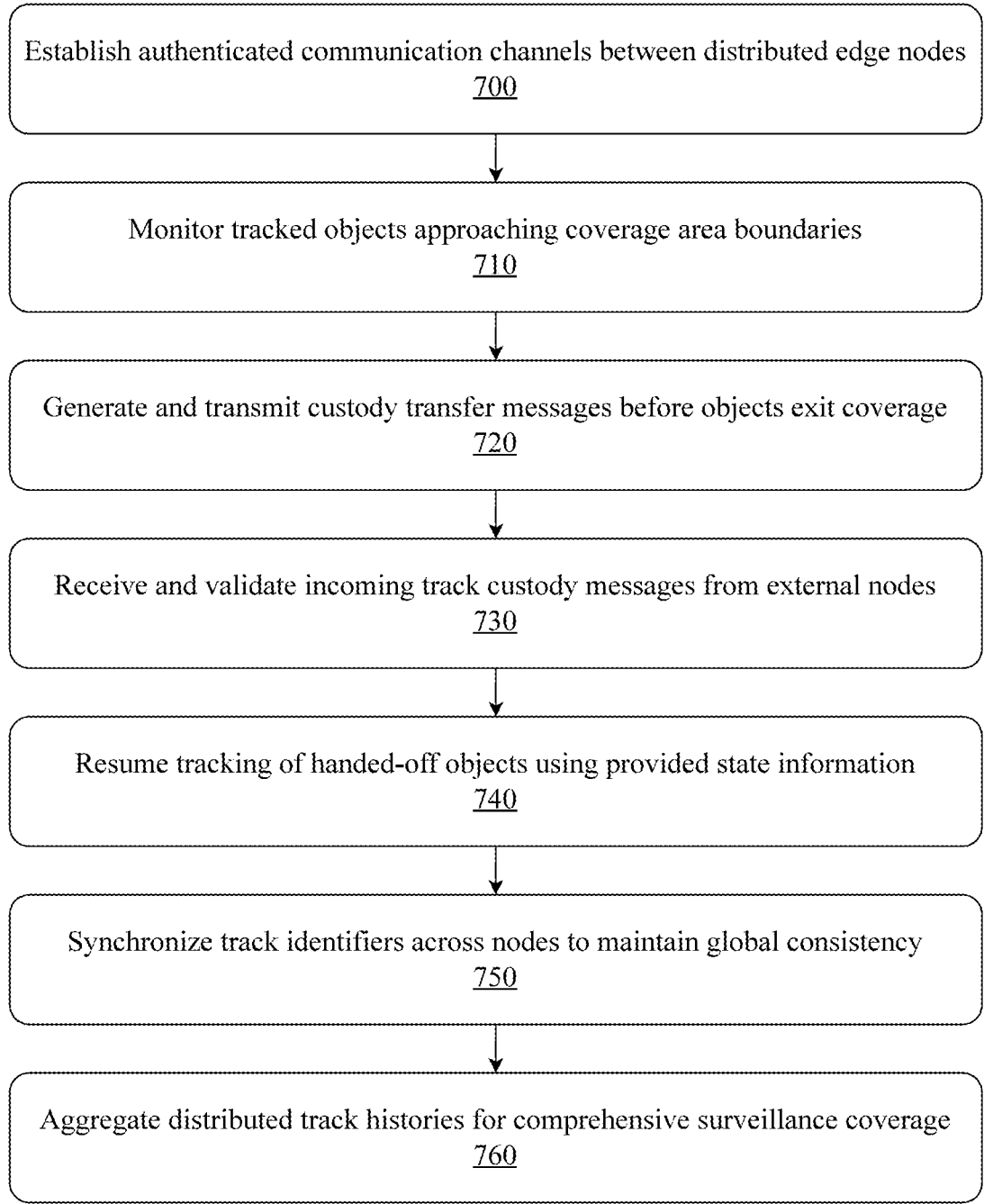

Establish authenticated communication channels between distributed edge nodes
700

Monitor tracked objects approaching coverage area boundaries
710

Generate and transmit custody transfer messages before objects exit coverage
720

Receive and validate incoming track custody messages from external nodes
730

Resume tracking of handed-off objects using provided state information
740

Synchronize track identifiers across nodes to maintain global consistency
750

Aggregate distributed track histories for comprehensive surveillance coverage
760

FIG. 7

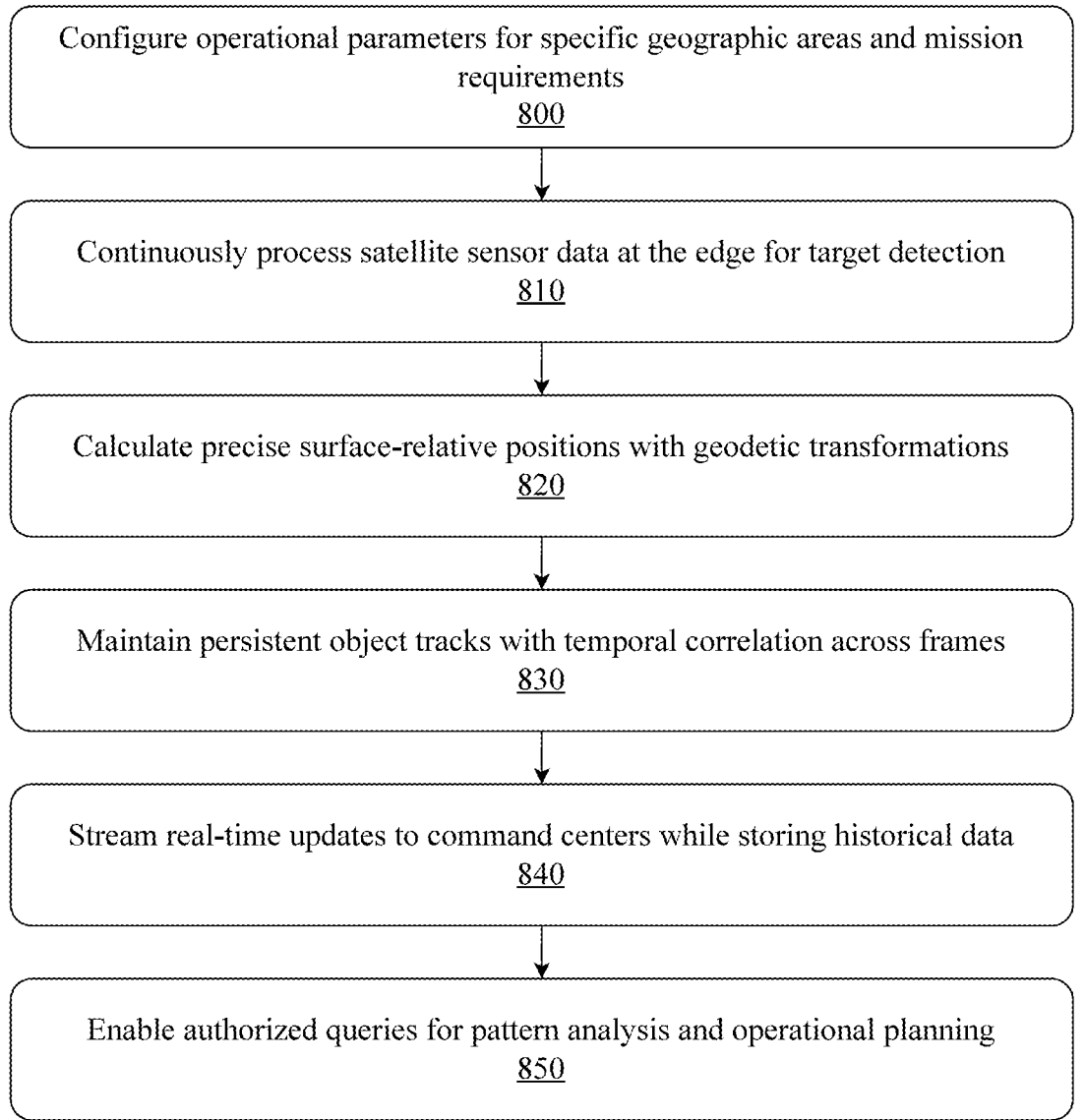

Configure operational parameters for specific geographic areas and mission requirements
800

Continuously process satellite sensor data at the edge for target detection
810

Calculate precise surface-relative positions with geodetic transformations
820

Maintain persistent object tracks with temporal correlation across frames
830

Stream real-time updates to command centers while storing historical data
840

Enable authorized queries for pattern analysis and operational planning
850

FIG. 8

EDGE-DEPLOYED AUTOMATED TARGET RECOGNITION AND TRACKING SYSTEM WITH DISTRIBUTED PROCESSING ARCHITECTURE

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The field of the art relates to automated target recognition (ATR) systems, and more particularly to distributed edge-computing architectures for real-time object detection and tracking in satellite-based sensor networks.

Discussion of the State of the Art

Automated target recognition (ATR) systems process sensor data to detect, identify, and track objects of interest in real-time operational environments. Traditional ATR systems operate primarily in centralized cloud computing environments where sensor data is transmitted from collection platforms to remote data centers for processing. These cloud-based architectures leverage substantial computational resources to run complex detection and tracking algorithms, typically employing deep learning models and multi-stage processing pipelines. The centralized approach allows for sophisticated processing capabilities and access to large-scale computational infrastructure, making it suitable for applications where latency is not critical and reliable high-bandwidth communication links are available.

Current satellite-based ATR implementations face significant challenges related to data transmission bottlenecks and processing delays. Raw sensor data from satellites must be downlinked to ground stations and then forwarded to processing centers, introducing latency that can range from minutes to hours depending on satellite orbit and ground station availability. This delay limits the effectiveness of ATR systems for time-sensitive applications such as real-time surveillance, disaster response, or tactical operations. Additionally, the bandwidth limitations of satellite downlinks constrain the volume of data that can be transmitted, often requiring compression or selective transmission that may compromise detection accuracy.

Recent developments in edge computing have begun to influence ATR system design, with some implementations moving limited processing capabilities closer to the sensor. However, most edge-deployed systems focus on simple preprocessing tasks such as data filtering or compression, while maintaining dependence on cloud infrastructure for core ATR functions. These hybrid approaches still require substantial data transmission for final processing and typically cannot maintain track continuity when objects move between sensor coverage areas or when different satellite systems need to coordinate tracking efforts.

The challenge with current ATR architectures is their inability to perform complete detection and tracking workflows at the edge while maintaining geodetic accuracy and enabling seamless track handoffs between distributed nodes. Existing systems lack the architectural flexibility to operate autonomously at the sensor edge while simultaneously coordinating with other ATR nodes for continuous tracking. Furthermore, current implementations do not effectively integrate real-time geodetic localization with object tracking in resource-constrained edge environments.

What is needed is a distributed edge-computing architecture for ATR systems that can perform complete detection and tracking workflows at the satellite sensor edge, maintain accurate geodetic localization, transform enormous volumes of image data into concise track state messages, and enable seamless track custody transfer of tracked targets between multiple ATR nodes while operating within the computational and communication constraints of satellite sensor edge deployment.

SUMMARY OF THE INVENTION

Accordingly, the inventor has conceived and reduced to practice, an edge-deployed automated target recognition and tracking system with distributed processing architecture. The system transforms raw satellite imagery into precisely geolocated object track state messages through a distributed processing architecture comprising specialized components for image analysis, object detection, track management, and inter-node communication. By implementing algorithms for sensor image frame data ingest, sensor image metadata ingest, geodetic sensor image frame alignment, adaptive sensor image frame contrast enhancement and histogram normalization, geodetic image coordinate transformation, and temporal correlation of GPU-accelerated target detections at the edge through concurrent edge-deployed processes, the system achieves sub-second processing latencies compared to traditional cloud-based approaches that require minutes or hours for data transmission and processing.

The system is able to maintain continuous object tracking across multiple distributed nodes through an authenticated track custody transfer mechanism. When tracked objects approach the boundary of one satellite's sensor coverage area, the system generates comprehensive track state messages containing geodetically relevant kinematic information, uncertainty estimates, and track histories that enable seamless handoff to neighboring satellite nodes and ground stations. This distributed architecture supports both autonomous edge operation during communication outages and coordinated multi-node surveillance when connected, while integrating with cloud infrastructure for neural network object detection model updates and historical track state analysis. The comprehensive messaging infrastructure ensures temporal synchronization across the distributed network while supporting real-time streaming to operational displays and secure access control for different user roles.

According to a preferred embodiment, a computer system comprising: a hardware memory, wherein the computer system is configured to execute software instructions stored on non-transitory machine-readable storage media that: receive sensor data from an imaging system at an edge computing platform; process images through one or more machine learning models to detect objects within the sensor data; transform detected objects from image coordinates to geodetic coordinates using geometric transformations derived from image metadata; maintain track states for the detected objects by associating detections across multiple time periods; monitor the track states to identify tracked objects approaching a coverage boundary of the imaging system; generate custody transfer messages for the identified objects, wherein the custody transfer messages include state information sufficient to enable continued tracking; transmit the custody transfer messages to one or more external tracking nodes before the identified objects exit coverage; receive incoming custody messages from the one or more external tracking nodes for objects entering coverage; and initialize tracking of objects identified in the incoming custody messages using the received state information, is disclosed.

According to another preferred embodiment, a method for edge-deployed automated target recognition and tracking with distributed processing, comprising the steps of: receiving sensor data from an imaging system at an edge computing platform; processing images through one or more machine learning models to detect objects within the sensor data; transforming detected objects from image coordinates to geodetic coordinates using geometric transformations; maintaining track states for the detected objects by associating detections across multiple time periods; monitoring the track states to identify tracked objects approaching a coverage boundary of the imaging system; generating custody transfer messages for the identified objects, wherein the custody transfer messages include state information sufficient to enable continued tracking; transmitting the custody transfer messages to one or more external tracking nodes before the identified objects exit coverage; receiving incoming custody messages from the one or more external tracking nodes for objects entering coverage; and initializing tracking of objects identified in the incoming custody messages using the received state information, is disclosed.

According to an aspect of an embodiment, the geometric transformations comprise homography matrices that map pixel coordinates between consecutive frames to account for satellite platform movement and sensor pointing accuracy variations.

According to an aspect of an embodiment, the custody transfer messages include kinematic state vectors, covariance matrices characterizing position uncertainties, track history summaries, base64 encoded PNG pixel groups of detections within the pixel bounds of the detection boxes, and classification probabilities.

According to an aspect of an embodiment, the edge computing platform implements a message broker that orchestrates asynchronous inter-process communication between concurrent detection and tracking components using publish-subscribe messaging patterns.

According to an aspect of an embodiment, associating detections across multiple time periods employs vectorized association cost estimates quantified by Gaussian probabilistic Intersection-over-Union calculation derived from geodetic oriented bounding box covariance as a means of measuring similarities between recent detections and existing tracks with respect to geospatial separation and orientation in order to update and predict track state estimates through Kalman filtering to refine geodetic position and velocity estimates based on new observations in SI units on shared coordinate reference frame accessible and knowable by each node.

According to an aspect of an embodiment, monitoring track states includes calculating time-to-boundary predictions based on current positions and velocity vectors to prioritize custody transfers.

According to an aspect of an embodiment, the machine learning models are optimized for edge deployment through quantization and pruning techniques that reduce computational requirements while maintaining detection accuracy.

According to an aspect of an embodiment, the machine learning models execute on GPU processors using parallel processing.

According to an aspect of an embodiment, initializing tracking includes assigning unique track identifiers that persist across distributed nodes to prevent duplicate tracking of the same object and failed associations between nodes.

BRIEF DESCRIPTION OF THE DRAWING FIGURES

FIG. 6 is a flow diagram illustrating an exemplary method for edge-based object detection and tracking in satellite imaging systems.

FIG. 7 is a flow diagram illustrating an exemplary method for distributed multi-node track coordination enabling continuous object tracking across multiple sensor coverage areas.

FIG. 8 is a flow diagram illustrating an exemplary method for real-time geodetic surveillance operations using edge-based processing.

DETAILED DESCRIPTION OF THE INVENTION

Figure 1:
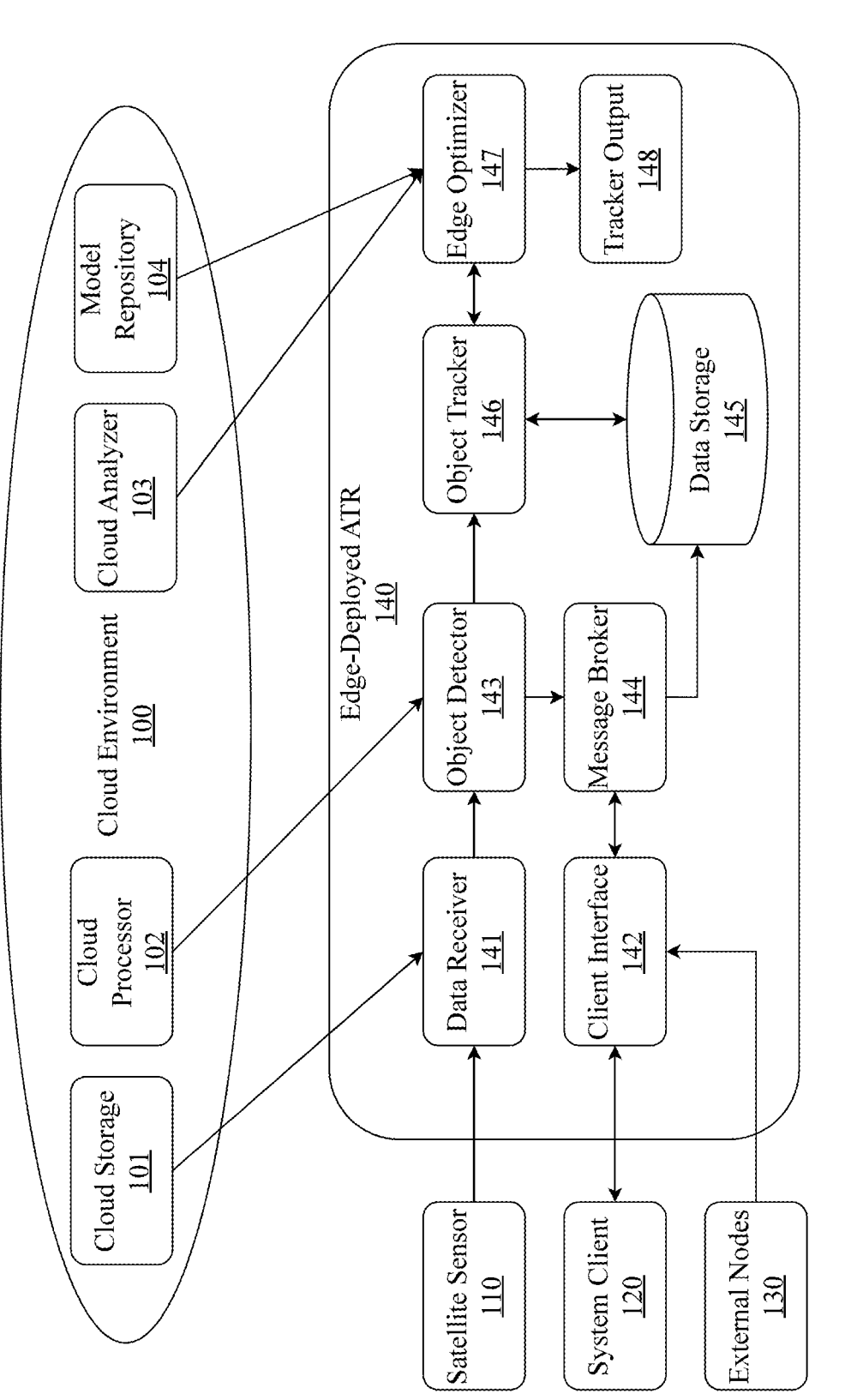
FIG. 1 is a block diagram illustrating an exemplary system architecture for an edge-deployed automated target recognition (ATR) system architecture that integrates cloud-based resources with edge computing capabilities for real-time object detection and tracking.

The inventor has conceived, and reduced to practice, an edge-deployed automated target recognition and tracking system with distributed processing architecture. The system operates by receiving continuous streams of satellite sensor data at edge computing platforms co-located with or near the satellite, implementing specialized algorithms for sensor image frame data ingest and concurrent sensor image metadata ingest that capture both pixel data and associated positioning, timing, and calibration information. An object detector processes the imagery through multiple stages including geodetic sensor image frame alignment to compensate for satellite motion and establish precise geographic correspondence between sequential frames, adaptive sensor image frame contrast enhancement and histogram normalization to optimize detection performance across varying illumination conditions and atmospheric effects, transformation calculation for geometric corrections that account for sensor distortions and Earth curvature, GPU-accelerated machine learning-based object detection leveraging parallel processing capabilities for real-time neural network inference, and geodetic image coordinate transformation to map detections from pixel space to precise Earth coordinates with associated uncertainty estimates.

These detection results flow through a message broker implementing concurrent edge-deployed processes to an object tracker that maintains persistent tracks by associating new detections with existing objects through temporal correlation algorithms, updating state estimates with uncertainty quantification using and managing track lifecycles from initialization through termination. The distributed architecture enables multiple edge nodes to coordinate through authenticated communication channels, where nodes monitor tracked objects approaching their sensor coverage boundaries and generate comprehensive track state messages containing geodetically relevant kinematic information including position, velocity, and acceleration vectors with associated covariance matrices, uncertainty estimates propagated through the tracking filters, and track histories that enable seamless handoffs to neighboring satellite nodes and ground stations.

A client interface provides bidirectional communication with operational systems, streaming real-time track state updates while accepting commands and queries, with all containerized components orchestrated through the message broker that ensures temporal synchronization across concurrent processes and reliable message delivery. This edge-based approach eliminates the latency and bandwidth limitations of traditional cloud-centric architectures while maintaining the ability to integrate with cloud resources for neural network object detection model updates, training dataset synchronization, and comprehensive historical track state analysis when connectivity permits.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for an edge-deployed automated target recognition (ATR) system architecture that integrates cloud-based resources with edge computing capabilities for real-time object detection and tracking. The system includes a cloud environment 100 that provides supporting infrastructure and an edge-deployed ATR 140 that performs autonomous processing at the satellite sensor edge.

Cloud environment 100 includes cloud storage 101 that maintains historical tracking data, training datasets, and system configurations accessible to multiple edge nodes. A cloud processor 102 performs computationally intensive tasks such as model training, complex multi-source correlation, and system-wide optimization that exceed edge computing constraints. A cloud analyzer 103 conducts pattern analysis, generates performance metrics, and identifies optimization opportunities across the distributed ATR network. A model repository 104 stores trained machine learning models, processing parameters, and configuration updates that are periodically synchronized with edge nodes to maintain optimal detection and tracking performance.

An edge-deployed ATR 140 operates as a self-contained processing unit. In one embodiment it may be located on or in close proximity to a satellite system. A satellite sensor 110 captures imagery and streams raw sensor data packets directly to a data receiver 141, which implements a high-throughput ingestion service that buffers and stores incoming data to local disk storage. This edge-side buffering enables the system to handle variable data rates and temporary processing delays without data loss.

A system client 120 connects to edge-deployed ATR 140 through a client interface 142, which provides a bidirectional communication channel. In one embodiment, this may be achieved using websocket protocols. Client interface 142 authenticates users, parses commands, streams real-time tracking updates, and manages session state. External nodes 130 represent other ATR-equipped satellites or ground systems that can exchange tracking information with the local system. These external nodes 130 communicate through client interface 142 to transfer track custody when objects move between coverage areas, enabling continuous surveillance across multiple platforms.

An object detector 143 retrieves buffered image data from the data receiver 141 and processes it through multiple stages. Object detector 143 performs frame-to-frame alignment using co-registration techniques to compensate for satellite motion and viewing angle changes. It calculates homography transformations that enable precise geometric corrections. Object detector 143 then applies trained neural network models to identify objects of interest within each frame. It transforms pixel-space detections into geodetic coordinates using the calculated transformations and satellite ephemeris data, producing detection results that include object classifications, confidence scores, and Earth-relative positions.

A message broker 144 serves as the central nervous system of edge-deployed ATR 140, orchestrating asynchronous communication between all internal components. Message broker 144 implement a publish-subscribe pattern where services can post messages to topic-based queues and subscribe to relevant message streams. Message broker 144 maintains temporal ordering using synchronized timestamps, manages message routing between producers and consumers, and provides both real-time streaming and historical query interfaces. This architecture enables loose coupling between services while ensuring reliable message delivery and proper event sequencing.

An object tracker 146 subscribes to detection messages from the message broker 144 and maintains persistent track states across multiple observations. It implements association algorithms that match new detections to existing tracks based on spatial proximity, motion models, and appearance features. For unmatched detections, object tracker 146 initializes new track hypotheses. Object tracker 146 maintains state estimates including position, velocity, and uncertainty covariances for each active track. It also handles track lifecycle management, including track confirmation, maintenance, and termination based on detection history and quality metrics.

A data storage 145 implements a dual-database architecture managed by message broker 144. The primary database supports high-throughput writes for real-time message streaming, using a producer-consumer pattern that allows client interface 142 to efficiently relay messages to connected clients. The secondary database provides indexed storage optimized for historical queries, enabling authorized clients to search and retrieve past tracking data for analysis, forensics, or pattern recognition. This separation ensures that real-time operations remain responsive while supporting comprehensive data retention and retrieval capabilities.

An edge optimizer 147 continuously monitors system performance and adjusts processing parameters to maximize efficiency within edge computing constraints. It analyzes metrics such as but not limited to processing latency, detection accuracy, memory usage, and power consumption. Based on these metrics and current operational requirements, it dynamically adjusts parameters such as image resolution, processing frame rates, detection thresholds, and model complexity. Edge optimizer 147 also coordinates with cloud-based optimization services when available, downloading updated models from model repository 104 and implementing processing strategies recommended by cloud analyzer 103.

A tracker output 148 represents the final tracking products generated by the system, including real-time track state messages, visualization data, and standardized reports. These outputs follow defined message formats that enable interoperability with downstream systems, command centers, and other ATR nodes. Track messages include unique identifiers, timestamp information, geodetic positions, velocity estimates, classification labels, and quality indicators. The system can also generate GeoJSON formatted visualization data that enables track display on mapping interfaces, showing object trajectories, uncertainty ellipses, and prediction zones.

The architecture is capable of performing complete ATR workflows at the edge while maintaining coordination capabilities with cloud resources and peer nodes. During normal operations, edge-deployed ATR 140 operates autonomously, processing sensor data, detecting objects, maintaining tracks, and serving clients without requiring cloud connectivity. When cloud connections are available, the system synchronizes tracking data to cloud storage 101, receives updated models from model repository 104, and benefits from cloud-based analysis and optimization. This hybrid approach combines the low latency and reliability of edge processing with the computational power and global perspective of cloud resources, creating a robust and scalable solution for distributed satellite-based surveillance.

According to an exemplary embodiment, edge-deployed ATR 140 implements a containerized deployment architecture that enables consistent, scalable, and isolated execution of system components across diverse edge computing environments. Each component, including but not limited to object detector 143, object tracker 146, message broker 144, and client interface 142, operates within its own container, providing process isolation, resource management, and deployment flexibility. The containerization approach utilizes industry-standard container runtimes compatible with orchestration platforms such as Kubernetes, enabling automated deployment, scaling, and management of the distributed ATR system across multiple edge nodes.

The containerized architecture implements a microservices pattern where each container exposes well-defined APIs for inter-service communication while maintaining internal implementation independence. Container images are built from minimal base operating systems to reduce attack surface and resource footprint, helpful for edge deployment where computational resources and storage are constrained. Each container image includes only the specific libraries, dependencies, and runtime environments required for its service, optimizing memory usage and startup times. The data receiver 141 container, for example, includes high-performance networking libraries and disk I/O optimizations, while the object detector 143 container includes machine learning frameworks and GPU drivers without unnecessary system utilities.

Container orchestration manages the lifecycle of these containerized services, implementing health checks that monitor service availability and automatically restart failed containers. Resource limits are defined for each container, preventing any single service from monopolizing edge computing resources and ensuring predictable performance under load. The orchestration layer implements rolling updates that enable zero-downtime deployment of new models or software versions, helpful for maintaining continuous surveillance operations. Network policies define permitted communication paths between containers, implementing defense-in-depth security where compromise of one service does not automatically grant access to others. Persistent volumes are mounted to specific containers requiring durable storage, such as data storage 145, while ephemeral storage is used for temporary processing data to minimize disk wear on edge hardware.

According to another exemplary embodiment, edge-deployed ATR 140 leverages GPU-accelerated hardware to achieve real-time processing performance within edge computing power constraints. The system implements a heterogeneous computing architecture where computationally intensive tasks are offloaded to GPU processors while CPU resources handle control flow, I/O operations, and sequential processing tasks. Object detector 143 utilizes GPU acceleration for neural network inference, achieving greater speeds when compared to CPU-only processing for convolutional neural network operations. The GPU architecture enables parallel processing of multiple image regions simultaneously, important for maintaining real-time performance when processing high-resolution satellite imagery.

The GPU-accelerated implementation may utilize optimized libraries such as but not limited to CUDA, cuDNN, or OpenCL that provide hardware-specific optimizations for matrix operations, convolutions, and other computations fundamental to machine learning inference. Memory management strategies minimize data transfer between CPU and GPU memory spaces, a common bottleneck in heterogeneous computing. The system implements batch processing where multiple detection operations are grouped and processed simultaneously on the GPU, amortizing memory transfer overhead and maximizing GPU utilization. For edge deployments with limited GPU memory, the system implements memory pooling and dynamic allocation strategies that share GPU memory across different processing stages, preventing out-of-memory errors while maintaining performance.

Power management capabilities adapt GPU processing based on available power budgets and thermal constraints typical of edge deployments. The system may monitor GPU temperature and power consumption, dynamically adjusting processing rates to prevent thermal throttling that would degrade performance. During periods of reduced activity, GPU clock speeds are lowered to conserve power, while high-priority detections trigger maximum performance modes. The architecture supports various GPU configurations from embedded GPUs in systems-on-chip (SoCs) for space-constrained satellite deployments to discrete GPUs in ground-based edge stations. Fallback mechanisms ensure continued operation when GPU resources are unavailable, automatically routing processing to CPU-based implementations with gracefully degraded performance. This adaptive approach ensures that the system can leverage available GPU acceleration while maintaining operational capability across diverse edge computing platforms.

Figure 2:
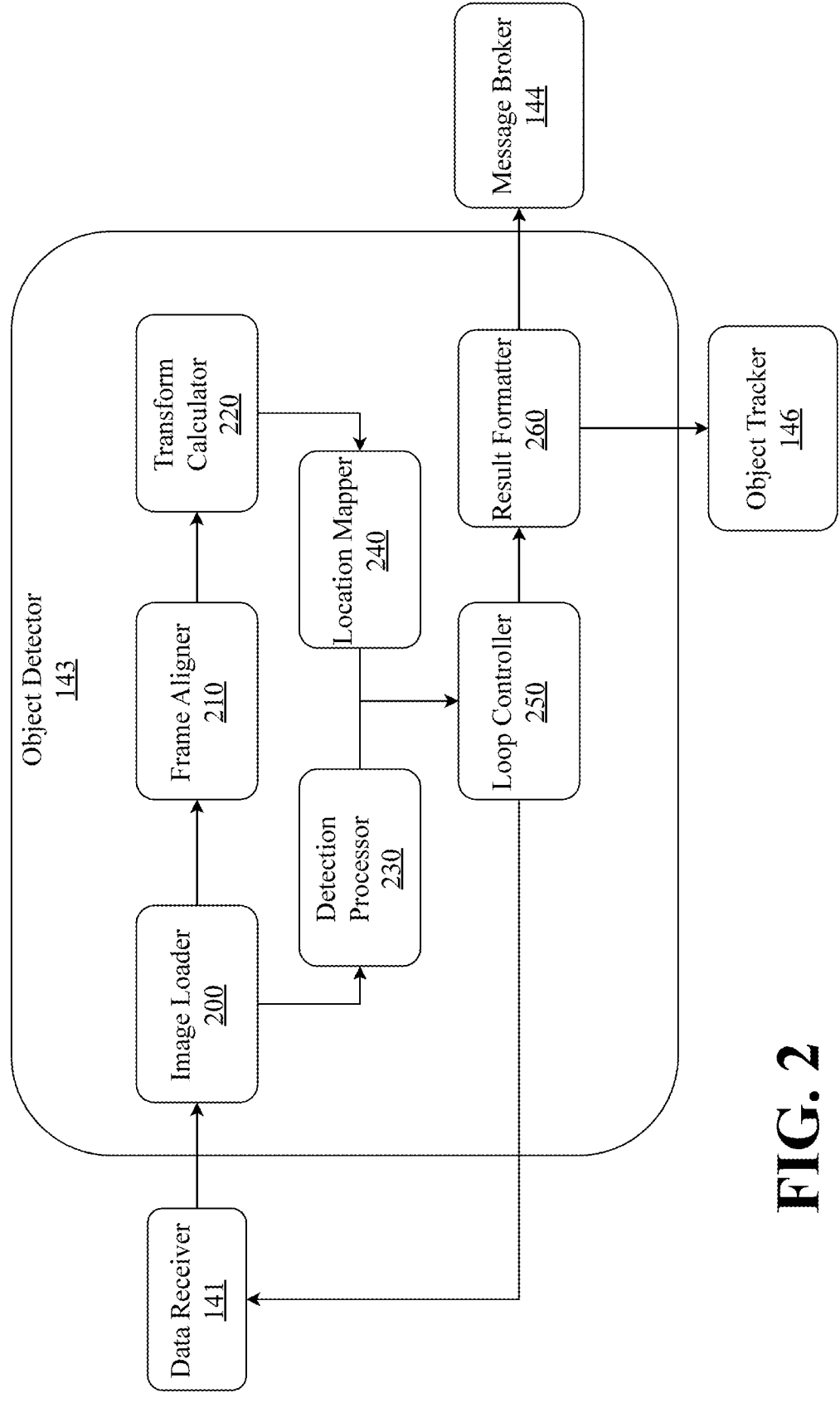
FIG. 2 is a block diagram illustrating an exemplary architecture for a component within an edge deployed ATR system, an object detector.

FIG. 2 is a block diagram illustrating an exemplary architecture for a component within an edge deployed ATR system, an object detector. Object detector 143 implements a pipeline that transforms raw sensor data into precisely located detection results suitable for tracking operations.

An image loader 200 serves as the entry point for the detection pipeline, interfacing with data receiver 141 to retrieve stored image packets from local disk storage. The image loader 200 implements efficient file I/O operations optimized for sequential access patterns typical of satellite imagery streams. It performs initial data validation, checking packet integrity and temporal sequencing to ensure frames are processed in the correct order. Image loader 200 also extracts embedded metadata from the image packets, including timestamp information, satellite position and attitude data, sensor parameters, and geographic footprint indicators. This metadata accompanies the image data throughout the processing pipeline, enabling accurate geolocation of detected objects.

A frame aligner 210 receives sequential image frames from image loader 200 and performs registration to establish pixel-level correspondence between consecutive captures. This alignment process compensates for various sources of inter-frame motion, including satellite platform movement, sensor pointing variations, and Earth rotation effects. Frame aligner 210 employs feature-based registration techniques, detecting distinctive keypoints in overlapping image regions and establishing matching correspondences. For scenarios with limited feature availability, such as ocean or desert regions, frame aligner 210 can fall back to correlation-based methods or utilize predicted motion models derived from satellite ephemeris data. The alignment process produces registration parameters that quantify the geometric relationship between frames, enabling coherent processing across the temporal sequence.

A transform calculator 220 utilizes the registration parameters from frame aligner 210 to compute precise geometric transformation matrices. These transformations go beyond simple translation and rotation, accounting for perspective effects, lens distortions, and terrain-induced variations. Transform calculator 220 specifically computes homography matrices that map pixel coordinates between frames, enabling the projection of detections from one frame's coordinate system to another. Additionally, it calculates the inverse transformations needed to map from image coordinates to ground coordinates, incorporating satellite positioning data, sensor models, and Earth surface models. Transform calculator 220 maintains a sliding window of recent transformations, enabling multi-frame integration for improved accuracy and robustness.

A detection processor 230 applies trained machine learning models to identify objects of interest within the imagery. Detection processor 230 receives both the original image data from image loader 200 and the transformation parameters from transform calculator 220. It implements a multi-scale detection approach, processing the image at various resolutions to detect objects of different sizes effectively. The neural network models employed by the detection processor 230 are optimized for edge deployment, utilizing techniques such as model quantization, pruning, and knowledge distillation to reduce computational requirements while maintaining detection accuracy. Detection processor 230 outputs bounding boxes, classification labels, and confidence scores for each detected object, along with feature descriptors that aid in subsequent tracking operations.

A location mapper 240 transforms the pixel-space detection results from detection processor 230 into real-world geodetic coordinates. This geolocation process leverages the transformation matrices computed by transform calculator 220 along with precise satellite ephemeris and sensor pointing information. Location mapper 240 projects each detection's bounding box corners through the imaging geometry to determine ground footprints, accounting for terrain elevation where available. It computes not just point locations but also positional uncertainties that reflect various error sources including satellite position knowledge, sensor calibration accuracy, and atmospheric effects. Location mapper 240 outputs detection results in standard geodetic formats, typically including latitude, longitude, elevation, and associated error ellipses that characterize localization uncertainty.

A loop controller 250 orchestrates the overall detection pipeline execution, managing the asynchronous processing flow and coordinating component interactions. It implements an event-driven architecture where each pipeline stage operates independently, communicating through message passing. Loop controller 250 monitors processing queues, balances computational loads, and ensures steady throughput despite varying input rates and processing complexities. It maintains processing state across iterations, enabling the detection pipeline to handle continuous streams of imagery without data loss or duplication. Loop controller 250 also interfaces with edge optimizer 147 to receive dynamic parameter updates, such as adjusting detection thresholds, modifying processing resolution, or switching between model variants based on current operational requirements.

A result formatter 260 packages the raw detection outputs into standardized message formats suitable for downstream consumption. It receives geodetically-located detection results from location mapper 240 and processing metadata from loop controller 250. Result formatter 260 constructs comprehensive detection messages that include object identifiers, classification labels, confidence scores, geodetic coordinates, uncertainty metrics, timestamp information, and source imagery references. It implements data compression where appropriate to minimize message sizes while preserving essential information. Result formatter 260 also generates auxiliary outputs such as detection statistics, processing metrics, and diagnostic information used for system monitoring and optimization.

The formatted detection results flow from result formatter 260 to message broker 144, which distributes them to subscribing components within the edge-deployed ATR system. The primary consumer is object tracker 146, which uses the detections to update existing tracks or initialize new ones. The detection messages are also archived in data storage 145 for historical analysis and may be streamed to connected clients through client interface 142.

Object detector 143 is able to maintain temporal coherence through the frame alignment and transformation pipeline. By establishing precise geometric relationships between consecutive frames, the system can predict where previously detected objects should appear, improving both detection efficiency and accuracy. This temporal integration also enables the detection of slowly moving or temporarily occluded objects that might be missed by single-frame analysis. The asynchronous, pipeline-based design ensures efficient resource utilization on edge computing platforms, allowing the system to achieve real-time performance despite computational constraints.

Figure 3:
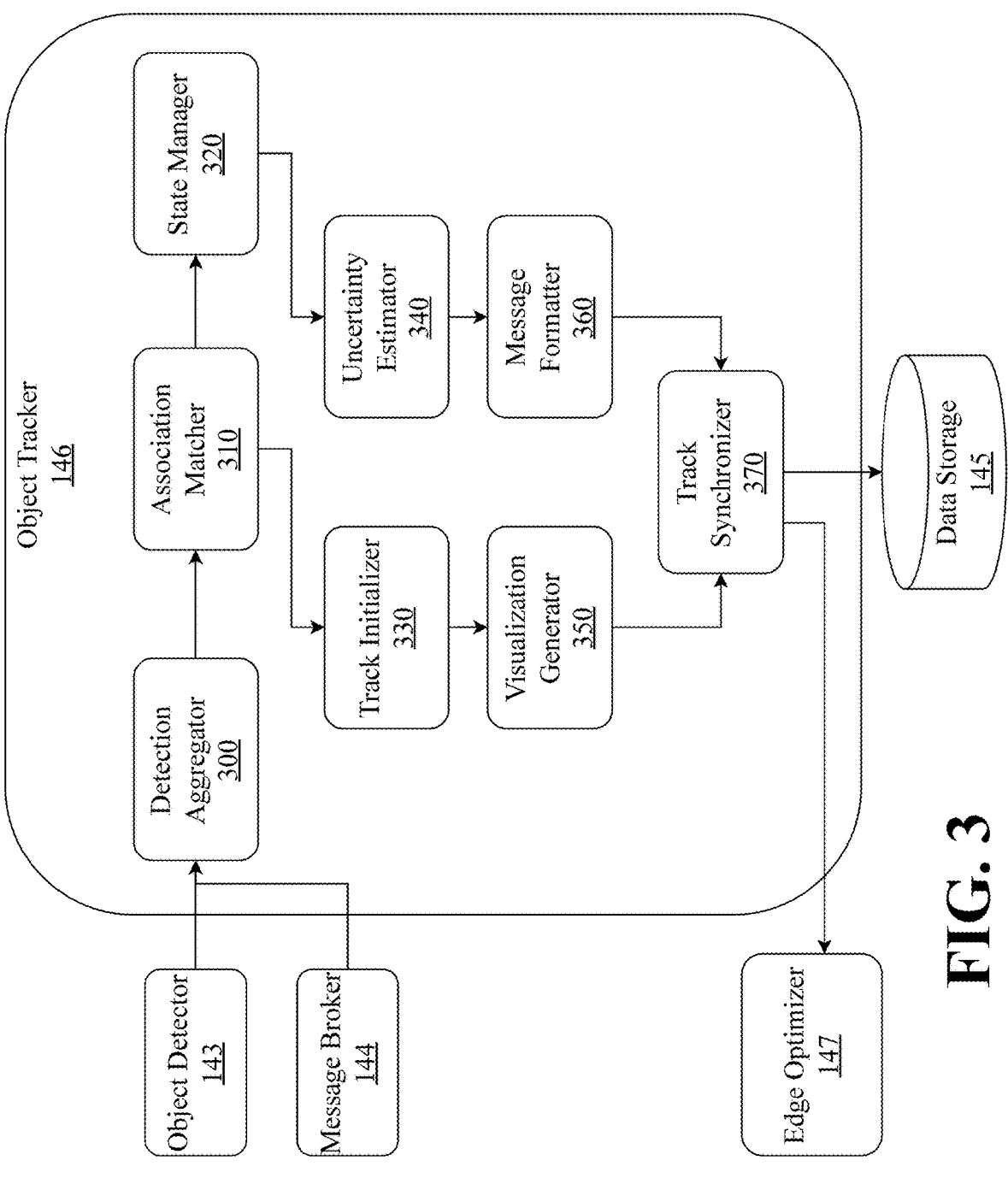
FIG. 3 is a block diagram illustrating an exemplary architecture for a component within an edge deployed ATR system, an object tracker.

FIG. 3 is a block diagram illustrating an exemplary architecture for a component within an edge deployed ATR system, an object tracker. Object tracker 146 implements algorithms for data association, state estimation, and track lifecycle management within the edge-deployed ATR system.

A detection aggregator 300 serves as the primary interface between object detector 143 and the tracking subsystem. It receives detection messages from object detector 143 through message broker 144 and organizes them into temporally coherent batches for processing. Detection aggregator 300 implements buffering strategies that account for variable detection latencies and out-of-order message delivery, ensuring that detections are processed in proper temporal sequence. It groups detections by timestamp and performs initial quality filtering, removing spurious detections based on confidence thresholds and consistency checks. For scenarios involving external track transfers, detection aggregator 300 also receives and processes track state messages from message broker 144, converting them into a format compatible with the local tracking system.

An association matcher 310 determines which detections correspond to existing tracked objects and which represent new objects entering the surveillance area. It receives organized detection batches from detection aggregator 300 and compares them against predicted object positions from current tracks. Association matcher 310 implements multiple association strategies including nearest-neighbor matching for simple scenarios and more advanced approaches such as but not limited to global nearest neighbor (GNN) or joint probabilistic data association (JPDA) for complex multi-target environments. The matching process considers multiple factors including spatial proximity, motion consistency, appearance similarity, and classification compatibility. Association matcher 310 computes association scores for all detection-track pairs and resolves conflicts where multiple detections could match the same track or vice versa.

A state manager 320 maintains the complete state information for all active tracks within the system. It receives association results from association matcher 310 and updates track states accordingly. For matched detection-track pairs, state manager 320 applies Kalman filtering or similar estimation techniques to refine position and velocity estimates based on the new observations. State manager 320 maintains comprehensive state vectors that include not just kinematic information (position, velocity, acceleration) but also classification probabilities, quality metrics, and tracking metadata. It implements track lifecycle policies, promoting tentative tracks to confirmed status after sufficient detections and terminating tracks that have not been observed for specified periods. State manager 320 also handles special scenarios such as track splitting when objects separate or track merging when multiple objects converge.

A track initializer 330 creates new track hypotheses for detections that could not be associated with existing tracks. It receives unmatched detections from association matcher 310 and evaluates whether they warrant new track creation based on factors such as detection confidence, location relative to sensor coverage, and consistency with expected object behaviors. Track initializer 330 establishes initial state estimates, typically assuming zero velocity for first detections but capable of incorporating motion priors when available. It assigns unique track identifiers that persist throughout the track lifecycle and across distributed nodes. Track initializer 330 also implements logic to prevent duplicate track creation in boundary regions where objects might be detected by multiple sensors simultaneously.

An uncertainty estimator 340 quantifies and propagates uncertainty throughout the tracking process, providing information for downstream decision-making. It receives state information from state manager 320 and computes comprehensive covariance matrices that characterize position and velocity uncertainties. Uncertainty estimator 340 accounts for multiple error sources including detection localization errors, motion model uncertainties, and temporal prediction errors. It implements covariance propagation through the tracking filters, ensuring that uncertainty grows appropriately during prediction phases and reduces when new observations are incorporated. Uncertainty estimator 340 also computes derived metrics such as error ellipses for visualization and gate sizes for association matching.

A visualization generator 350 creates human-interpretable representations of tracking data for operational displays and analysis tools. It receives track states from track initializer 330 and state manager 320, along with uncertainty information from uncertainty estimator 340. Visualization generator 350 produces GeoJSON-formatted vector data that includes track trajectories showing historical positions, current position markers with uncertainty ellipses, predicted future positions based on motion models, and track metadata such as identifiers and classification labels. The generated visualizations support multiple map projections and coordinate systems, enabling seamless integration with various geographic information systems (GIS) and command center displays.

A message formatter 360 packages tracking information into standardized message formats for distribution to other system components and external consumers. It receives comprehensive track data from state manager 320 and uncertainty estimator 340, creating messages that include all relevant tracking information while optimizing for bandwidth efficiency. Message formatter 360 implements multiple output formats to support different use cases: detailed messages for track custody transfers that include full state vectors and covariance matrices, streamlined messages for real-time display updates focusing on position and identification, and statistical summaries for system monitoring and analysis. Each message includes timestamp information synchronized across the distributed system, enabling proper temporal alignment of tracks from multiple sources.

A track synchronizer 370 manages the temporal aspects of track processing and coordinates with external tracking nodes to maintain global track consistency. It receives track data from message formatter 360 and visualization outputs from visualization generator 350. Track synchronizer 370 implements sophisticated time alignment algorithms that account for varying processing latencies across distributed nodes. When preparing track custody transfers, it extrapolates track states to common reference times, ensuring smooth handoffs between nodes. Track synchronizer 370 also maintains a track correlation database that maps local track identifiers to global identifiers used across the distributed network, preventing track duplication and enabling continuous surveillance as objects move between coverage areas.

Object tracker 146 interfaces with several external components to fulfill its role within the edge-deployed ATR system. It sends formatted track messages to data storage 145 for archival and historical analysis. Track synchronizer 370 coordinates with edge optimizer 147 to receive performance feedback and adjust tracking parameters dynamically. Parameters that may be optimized include association thresholds, track confirmation criteria, covariance inflation factors, and prediction horizons.

Object tracker 146 is able to maintain tracking continuity across distributed nodes while operating within edge computing constraints. The architecture supports both autonomous operation when isolated and coordinated operation when connected to the broader tracking network. The asynchronous, component-based design enables efficient processing of high-volume detection streams while maintaining the computational efficiency required for edge deployment. The comprehensive uncertainty management throughout the tracking pipeline ensures that downstream systems can make informed decisions based on track quality and reliability metrics.

Figure 4:
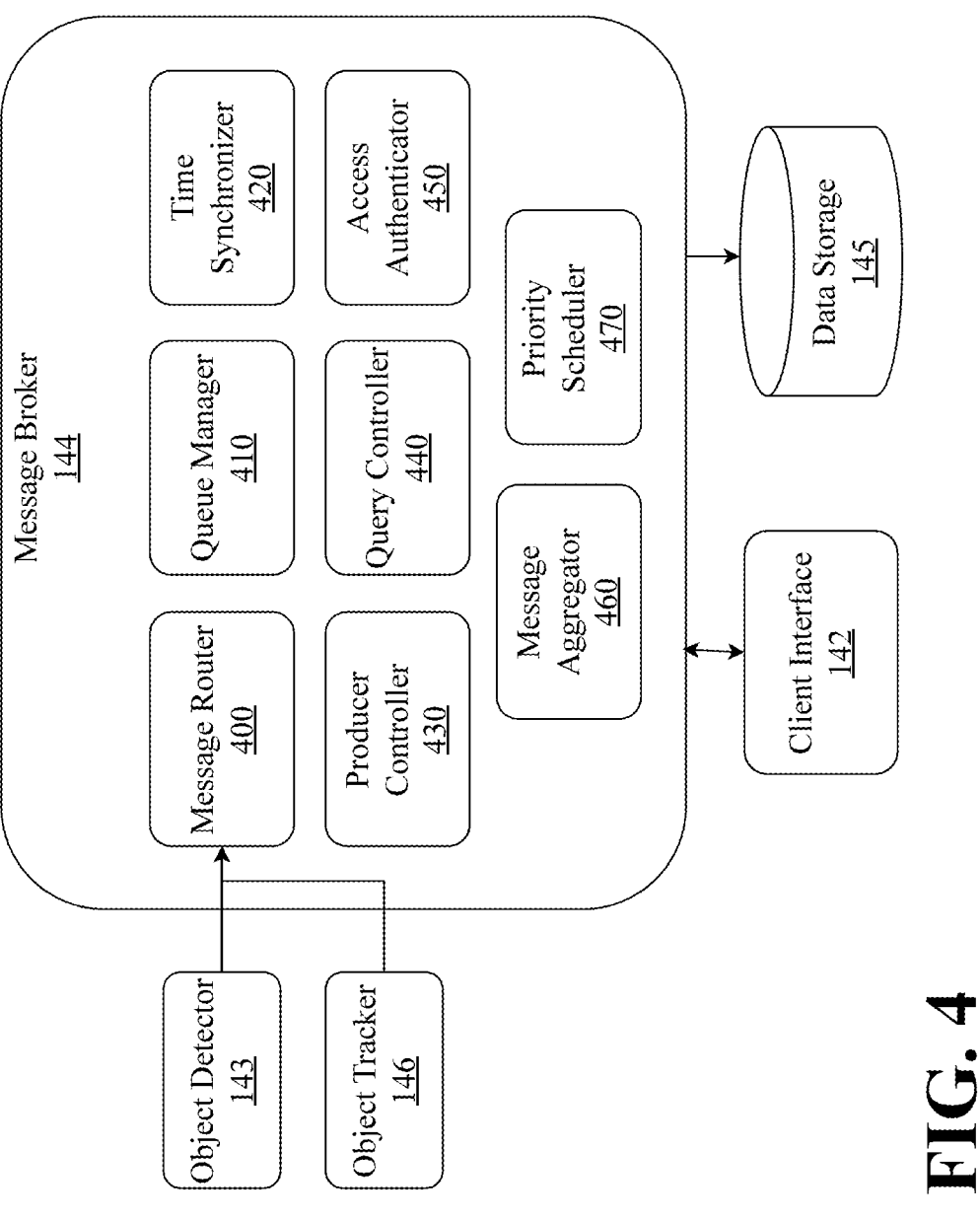
FIG. 4 is a block diagram illustrating an exemplary architecture for a component within an edge deployed ATR system, a message broker.

FIG. 4 is a block diagram illustrating an exemplary architecture for a component within an edge deployed ATR system, a message broker. Message broker 144 implements a publish-subscribe messaging infrastructure that enables asynchronous, loosely-coupled interactions while maintaining temporal coherence and supporting both real-time and historical data access patterns.

A message router 400 acts as a communication hub for message broker 144, implementing intelligent routing logic that directs messages from producers to appropriate consumers based on topic subscriptions and routing rules. It receives incoming messages from object detector 143 containing detection results and from object tracker 146 containing track updates. Message router 400 inspects message headers to determine message type, priority, and destination topics, then forwards messages to the appropriate internal queues. It implements topic-based routing where components can subscribe to specific message categories such as "detections," "tracks," "commands," or "system-status." Message router 400 also supports content-based routing for advanced scenarios where routing decisions depend on message payload characteristics, such as geographic region or object classification.

A queue manager 410 maintains multiple message queues that buffer messages between producers and consumers, ensuring reliable delivery despite varying processing rates. It receives routed messages from message router 400 and organizes them into topic-specific queues with configurable retention policies. Queue manager 410 implements both in-memory queues for low-latency operations and persistent queues backed by disk storage for reliability. Each queue supports multiple delivery semantics including at-most-once for notifications, at-least-once for reliable command delivery, and exactly-once for financial or audit messages. Queue manager 410 monitors queue depths and implements backpressure mechanisms to prevent memory exhaustion when consumers cannot keep pace with producers.

A time synchronizer 420 ensures temporal consistency across all messages flowing through the system, useful for correlating detections and tracks from different time periods. It maintains a synchronized time reference derived from GPS or other authoritative sources and timestamps all messages as they enter message broker 144. Time synchronizer 420 implements clock drift compensation algorithms that account for varying latencies in different processing paths. It can reorder messages based on their origination timestamps rather than arrival order, ensuring that consumers receive temporally coherent data streams. For track custody transfers and multi-node coordination, time synchronizer 420 provides time transformation services that align messages to common temporal reference frames.

A producer controller 430 manages the interface between message-producing components and the messaging infrastructure, optimizing for high-throughput data ingestion. It implements write-optimized data structures and batching strategies that allow object detector 143 and object tracker 146 to efficiently publish high-volume message streams. Producer controller 430 provides transaction support for scenarios requiring atomic publication of related messages, such as detection sets that must be processed together. It maintains producer-specific metrics including message rates, latency distributions, and error counts that feed into system optimization decisions. Producer controller 430 also implements flow control mechanisms that can throttle producers when system resources become constrained.

A query controller 440 provides sophisticated query capabilities over both real-time message streams and historical message archives. It supports SQL-like query syntax that allows clients to filter messages based on temporal ranges, geographic regions, object types, and other attributes. Query controller 440 implements query optimization techniques including index selection, predicate pushdown, and result caching to ensure efficient execution even over large message archives. It can execute standing queries that continuously process incoming messages and alert when specific conditions are met, enabling real-time monitoring and alerting capabilities. Query controller 440 coordinates with data storage 145 to retrieve historical messages while simultaneously processing live message streams for comprehensive query results.

An access authenticator 450 implements security controls that ensure only authorized components and users can publish or consume messages. It maintains access control lists that specify which entities can publish to specific topics and which can subscribe to message streams. Access authenticator 450 validates credentials presented by client interface 142 when external users request message access, generating temporary access tokens for authorized sessions. It implements role-based access control where different user classes have varying levels of message visibility, such as operators who can see all tracks versus analysts who only see specific regions. Access authenticator 450 also provides audit logging of all access attempts, creating forensic trails for security analysis.

A message aggregator 460 combines related messages into composite structures that provide comprehensive views of system state. It receives individual detection and track messages and aggregates them based on temporal windows, geographic regions, or object relationships. Message aggregator 460 is particularly important for client interface 142, creating unified update messages that include all tracks within a region rather than sending individual track updates. It implements smart aggregation that balances update frequency with message size, dynamically adjusting aggregation windows based on system load and client capabilities. Message aggregator 460 can also compute derived metrics such as track densities, detection rates, and system performance indicators that are published as synthetic messages.

A priority scheduler 470 ensures that important messages receive preferential processing during periods of high system load. It maintains multiple priority queues and schedules message delivery based on message importance, age, and consumer capacity. Priority scheduler 470 implements sophisticated scheduling algorithms that prevent priority inversion while ensuring that lower-priority messages are not indefinitely starved. Emergency messages such as high-priority target detections or system alerts bypass normal queuing and are immediately delivered to subscribers. Priority scheduler 470 works closely with queue manager 410 to reorder message delivery while maintaining temporal consistency requirements within each priority class.

Message broker 144 interfaces with data storage 145 to provide persistent message archival and retrieval capabilities. Producer controller 430 streams all messages to data storage 145 for long-term retention, while query controller 440 retrieves historical messages to satisfy client queries. This dual-database architecture separates real-time message flow from historical analysis, ensuring that archival operations do not impact real-time performance.

Message broker 144 is able to maintain high-performance message routing while providing sophisticated query and aggregation capabilities within edge computing constraints. The architecture supports millions of messages per minute while maintaining sub-millisecond routing latencies for priority messages. The temporal synchronization capabilities ensure that the distributed ATR system maintains coherent time references across all components for accurate tracking and multi-node coordination. The flexible security model enables deployment in various operational contexts while maintaining strict access controls and comprehensive audit trails.

Figure 5:
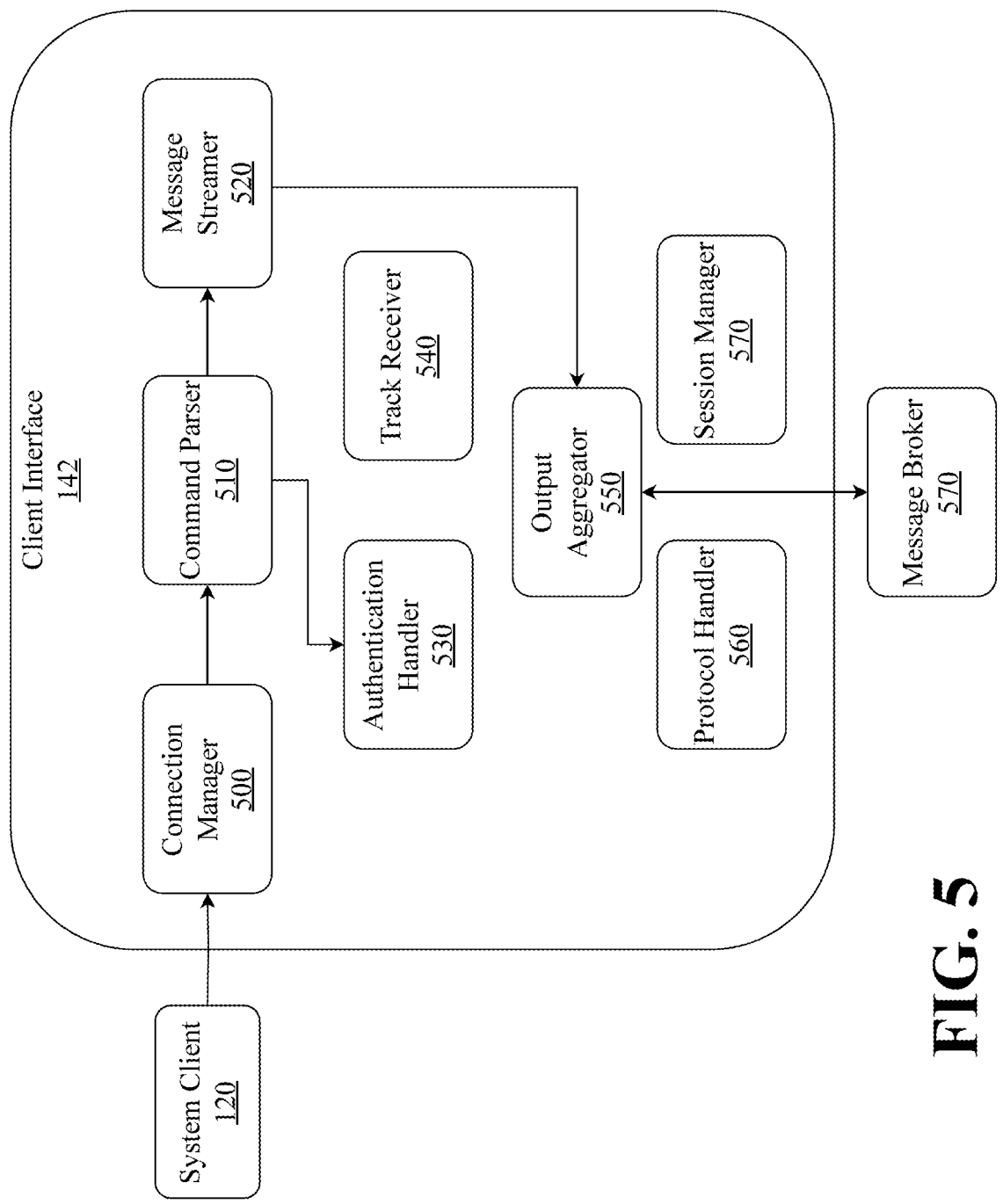
FIG. 5 is a block diagram illustrating an exemplary architecture for a component within an edge deployed ATR system, a client interface.

FIG. 5 is a block diagram illustrating an exemplary architecture for a component within an edge deployed ATR system, a client interface. Client interface 142 implements a bidirectional communication framework supporting real-time data streaming, command and control operations, and secure multi-client session management.

A connection manager 500 serves as the entry point for all client connections, implementing websocket-based communication protocols that enable persistent, low-latency bidirectional data exchange. When system client 120 initiates a connection, connection manager 500 performs initial handshaking, protocol negotiation, and connection establishment. It maintains a registry of active connections with associated metadata including client identifiers, connection timestamps, protocol versions, and quality-of-service parameters. Connection manager 500 implements connection pooling to efficiently handle multiple simultaneous clients while minimizing resource overhead. It monitors connection health through periodic heartbeat messages and automatically handles reconnection scenarios when network interruptions occur. Connection manager 500 also enforces connection limits and rate limiting to prevent resource exhaustion from misbehaving or malicious clients.

A command parser 510 processes incoming command messages from authenticated clients, translating high-level operational commands into specific system actions. It receives raw command data from connection manager 500 and implements a comprehensive command grammar that supports various operational scenarios. Commands may include subscription requests for specific geographic regions or object types, queries for historical track data, system configuration changes, or track custody transfer requests. Command parser 510 validates command syntax and semantic correctness, ensuring that requested operations are feasible within current system constraints. It maintains command context across multiple related messages, enabling complex multi-step operations while preserving atomicity and consistency. Command parser 510 also implements command versioning to maintain compatibility with clients using different protocol versions.

An authentication handler 530 implements comprehensive security controls to ensure that only authorized users can access system functions and data. It receives credential information from command parser 510 during initial connection establishment or when elevated privileges are requested. Authentication handler 530 supports multiple authentication mechanisms including username/password, certificate-based authentication, and token-based systems for integration with enterprise identity management. It validates credentials against local user databases or external authentication services, generating session tokens that encode user permissions and access rights. Authentication handler 530 implements role-based access control where different user classes have varying levels of system visibility and control authority. For example, operators might have full access to real-time tracks and system controls, while analysts may only access historical data from specific regions.

A message streamer 520 manages the real-time flow of tracking data from message broker 144 to connected clients. It receives processed track messages and detection alerts from message broker 144 and maintains client-specific streaming sessions based on active subscriptions. Message streamer 520 implements intelligent filtering to ensure clients only receive data relevant to their subscriptions, reducing bandwidth requirements and processing overhead. It supports multiple streaming modes including continuous streaming for real-time displays, snapshot mode for periodic updates, and delta mode that only transmits changes since the last update. Message streamer 520 implements adaptive streaming that automatically adjusts data rates based on network conditions and client capabilities, ensuring smooth operation even over limited-bandwidth connections.

A track receiver 540 handles incoming track custody transfer messages from external ATR nodes, enabling seamless tracking continuity as objects move between coverage areas. It processes specially formatted track state messages that include comprehensive information needed to resume tracking, including kinematic states, classification probabilities, uncertainty covariances, and track history summaries. Track receiver 540 validates incoming track messages for completeness and consistency, ensuring that all required fields are present and values fall within acceptable ranges. It performs coordinate transformations when necessary to align external track data with local reference frames. Track receiver 540 also implements duplicate detection logic to prevent the same track from being imported multiple times when operating in overlapping coverage areas.

An output aggregator 550 combines multiple data streams into unified output messages optimized for client consumption. It receives real-time track updates from message streamer 520 and track custody information from track receiver 540, creating comprehensive situational awareness pictures. Output aggregator 550 implements temporal alignment to ensure that all included data represents a consistent time snapshot for accurate operational displays. It performs geographic aggregation to group tracks within specified regions, reducing message frequency while maintaining information completeness. Output aggregator 550 also computes derived products such as track counts, density maps, and movement patterns that provide higher-level situational understanding. Output formats include both binary protocols for efficiency and JSON-based formats for interoperability.

A protocol handler 560 manages the low-level details of message encoding, compression, and transmission over the websocket connection. It receives aggregated output messages from output aggregator 550 and formats them according to the negotiated protocol version. Protocol handler 560 implements message framing that enables reliable message boundary detection even in streaming scenarios. It applies compression algorithms to reduce bandwidth requirements, with adaptive selection between different compression methods based on message characteristics and client capabilities. Protocol handler 560 also implements encryption for sensitive deployments, ensuring that tracking data remains confidential during transmission. It maintains transmission buffers that smooth out traffic bursts and provide reliable delivery even during temporary network congestion.

A session manager 570 maintains comprehensive state information for each client connection throughout its lifecycle. It coordinates among all other components to ensure consistent session handling, tracking authentication status, active subscriptions, command history, and performance metrics for each session. Session manager 570 implements session persistence that enables clients to resume sessions after temporary disconnections without losing subscription state or missing updates. It enforces session timeouts and resource limits to prevent inactive sessions from consuming system resources. Session manager 570 generates session audit logs that record all significant events including connection establishment, authentication attempts, commands executed, and data accessed. These audit trails support both security analysis and system troubleshooting.

Client interface 142 maintains bidirectional communication with message broker 144 through session manager 570. Commands processed by command parser 510 that require system-wide actions are forwarded to message broker 144 for distribution to appropriate components. Real-time tracking data flows from message broker 144 through message streamer 520 to connected clients. This architecture ensures that client interface 142 remains responsive to client requests while efficiently managing the high-volume data flows characteristic of real-time tracking systems.

Client interface 142 is able to support diverse client types and use cases through a single, unified architecture. The same interface can serve real-time operational displays requiring sub-second latency, support batch historical queries for analysis applications, and enable peer-to-peer track custody transfers between distributed nodes. The adaptive streaming and aggregation capabilities ensure efficient operation across varying network conditions, from high-bandwidth fiber connections to limited-capacity satellite links. The comprehensive security framework enables deployment in sensitive operational environments while maintaining usability and performance.

Detailed Description of Exemplary Aspects

FIG. 6 is a flow diagram illustrating an exemplary method for edge-based object detection and tracking in satellite imaging systems. In a first step 600, receive sensor data streams from satellite imaging systems at an edge computing platform. This step involves establishing data reception protocols that can handle continuous streams of imagery data directly from satellite sensors or their associated communication systems. The edge computing platform implements high-throughput data ingestion capabilities that buffer incoming packets to accommodate variable data rates and temporary processing delays. Raw sensor data typically includes not only image pixels but also metadata such as but not limited to timestamp information, satellite position and attitude parameters, sensor configuration details, and geographic coverage indicators. The reception process validates data integrity and maintains proper sequencing to ensure frames are processed in their correct temporal order.

In a step 610, align sequential image frames and calculate transformation matrices for geometric corrections. This alignment process establishes pixel-level correspondence between consecutive image captures to compensate for various sources of inter-frame motion including platform movement, sensor pointing variations, and earth rotation effects. Feature detection algorithms identify distinctive keypoints within overlapping regions of sequential frames, with matching algorithms establishing correspondences between these features. The transformation calculation derives mathematical relationships that map coordinates from one frame to another, typically computing homography matrices that account for translation, rotation, scale, and perspective effects. These transformations enable coherent processing across temporal sequences and provide the geometric foundation for accurate object localization.

In a step 620, process images through machine learning models to detect objects of interest. This processing applies trained neural network architectures optimized for edge deployment to identify relevant objects within the satellite imagery. Multi-scale detection approaches analyze images at various resolutions to effectively identify objects of different sizes, from small vehicles to large structures. The machine learning models may have been trained on representative satellite imagery datasets and optimized through techniques such as but not limited to quantization and pruning to reduce computational requirements while maintaining detection accuracy. Detection outputs include bounding box coordinates in image space, classification labels indicating object types, and confidence scores reflecting detection certainty.

In a step 630, map detected objects to precise geodetic coordinates on a surface. This mapping transforms pixel-space detection results into real-world geographic locations using the geometric transformations computed in earlier steps combined with satellite ephemeris and sensor pointing information. The geodetic transformation accounts for the complete imaging geometry, projecting detected object locations through the sensor model to determine ground positions. Terrain elevation data, when available, refines these calculations to account for topographic effects. The mapping process produces not just point locations but also positional uncertainties that characterize various error sources including satellite position knowledge, sensor calibration accuracy, and atmospheric effects.

In a step 640, associate new detections with existing tracked objects or initialize new tracks. This association process determines which detections correspond to previously observed objects and which represent newly detected entities. Association algorithms evaluate multiple factors including spatial proximity between predicted and detected positions, consistency with established motion patterns, similarity in object characteristics, and temporal feasibility. When detections cannot be reliably matched to existing tracks, new track hypotheses are initialized with state vectors derived from the current observation. The association logic must handle challenging scenarios such as closely spaced objects, crossing trajectories, and temporary occlusions.

In a step 650, update track states and estimate position uncertainties for all active objects. This updating process refines position and velocity estimates for tracked objects based on new observations, in one embodiment employing Kalman filtering or similar estimation techniques. State prediction propagates previous estimates forward in time using motion models, while measurement updates incorporate new detections to improve accuracy. Uncertainty estimation quantifies confidence in track states by maintaining and propagating covariance matrices that characterize various error sources. The update process also manages track lifecycle, promoting tentative tracks to confirmed status after sufficient observations and terminating tracks that have not been detected for specified periods.

In a step 660, generate visualization data showing object trajectories and covariances. This generation creates human-interpretable representations that convey tracking information effectively to operators and analysts. Trajectory visualizations show historical positions as connected paths, current positions with appropriate symbology, and predicted future positions based on motion models. Uncertainty visualizations typically render error ellipses or confidence regions that grow during prediction phases and shrink when new observations are incorporated. The visualization data is formatted in standard geographic data formats that enable integration with mapping systems and situational awareness displays.

In a step 670, stream formatted track information to operational systems and storage. This streaming delivers real-time tracking results to command centers, operational displays, and archival systems through appropriate communication protocols. Track messages include comprehensive state information such as unique identifiers, timestamp data, geodetic positions with uncertainties, velocity estimates, object classifications, and quality indicators. The streaming process implements adaptive data rates that balance timeliness with bandwidth constraints, potentially aggregating multiple updates or sending only significant changes. Archival streams ensure all tracking data is preserved for historical analysis, pattern recognition, and system performance evaluation.

FIG. 7 is a flow diagram illustrating an exemplary method for distributed multi-node track coordination enabling continuous object tracking across multiple sensor coverage areas. In a first step 700, establish authenticated communication channels between distributed edge nodes. This establishment creates secure network connections between geographically distributed tracking nodes that may be operated by the same organization or cooperating entities. Authentication protocols verify the identity of each participating node using methods such as certificate-based mutual authentication, pre-shared keys, or integration with existing security infrastructure. The communication channels implement encryption to protect sensitive tracking data during transmission and establish quality-of-service parameters to ensure timely message delivery. Channel establishment may include capability negotiation where nodes exchange information about supported message formats, coordinate systems, and tracking capabilities to ensure interoperability.

In a step 710, monitor tracked objects approaching coverage area boundaries. This monitoring continuously evaluates the positions and trajectories of all tracked objects to identify those likely to exit the local sensor's field of view. Boundary detection algorithms consider not only current positions but also velocity vectors and predicted trajectories to provide advance warning of impending coverage transitions. The monitoring process accounts for coverage area geometry, which may be irregular due to terrain masking, sensor limitations, or operational constraints. Time-to-boundary calculations estimate when each tracked object will exit coverage, enabling prioritization of custody transfer operations based on urgency and object importance.

In a step 720, generate and transmit custody transfer messages before objects exit coverage. This generation creates comprehensive messages containing all information necessary for another node to seamlessly continue tracking. Custody transfer messages include current kinematic states with position and velocity estimates, complete covariance matrices characterizing state uncertainties, track history summaries showing recent behavior patterns, classification information including object type probabilities, and quality metrics indicating track reliability. The transmission timing ensures messages arrive at receiving nodes with sufficient lead time to prepare for track acquisition, typically trans- mitting when objects are predicted to exit coverage within a specified time window.

In a step 730, receive and validate incoming track custody messages from external nodes. This reception processes custody transfer messages arriving from other tracking nodes to prepare for incoming objects. Validation ensures message integrity through checksums or digital signatures, completeness by verifying all required fields are present, and temporal consistency by checking that state timestamps align with expected arrival times. The validation process also screens for duplicate messages that might arrive via multiple paths and resolves any conflicts between multiple nodes attempting to transfer the same track. Geographic validation confirms that transferred tracks are indeed approaching the local coverage area based on their reported positions and velocities.

In a step 740, resume tracking of handed-off objects using provided state information. This resumption initializes local tracking processes with the transferred state data, enabling continuous tracking without starting from scratch. State information from custody messages populates local tracking filters, with appropriate coordinate transformations applied if source and destination nodes use different reference frames. The resumption process may involve a brief overlap period where both nodes track the same object, enabling verification of successful handoff before the originating node releases the track. Motion model parameters and classification priors from the custody message inform initial tracking behavior until local observations refine these esti- mates.

In a step 750, synchronize track identifiers across nodes to maintain global consistency. This synchronization ensures that the same physical object maintains consistent identifi- cation throughout the distributed tracking network. Identifier mapping tables correlate local track identifiers with global identifiers that persist across node boundaries. The synchro- nization process resolves identifier conflicts that may arise when different nodes independently detect the same object, implementing precedence rules based on factors such as detection time, track quality, or node authority. Periodic synchronization messages between nodes maintain identifier consistency even during extended operations, with mecha- nisms to detect and correct any divergence.

In a step 760, aggregate distributed track histories for comprehensive surveillance coverage. This aggregation combines track segments from multiple nodes to create complete object trajectories spanning the entire surveillance network. History aggregation aligns track segments based on global identifiers and temporal overlap, merging kine- matic states and associated metadata into unified track records. The aggregation process handles gaps where objects may have been temporarily unobserved between coverage areas, interpolating positions when appropriate or marking periods of uncertainty. Statistical aggregation com- putes network-wide metrics such as object counts, move- ment patterns, and coverage effectiveness that would not be apparent from individual node data alone.

FIG. 8 is a flow diagram illustrating an exemplary method for real-time geodetic surveillance operations using edge- based processing. In a first step 800, configure operational parameters for specific geographic areas and mission requirements. This configuration establishes the operational context by defining areas of interest through geographic boundaries, polygons, or corridors that focus surveillance efforts. Mission-specific parameters include target types of interest, detection sensitivity thresholds, tracking persis- tence criteria, and reporting requirements. The configuration process adapts processing algorithms to regional character- istics, such as adjusting detection parameters for urban versus rural environments or maritime versus terrestrial scenarios. Temporal parameters define operational sched- ules, collection frequencies, and data retention policies aligned with mission objectives. Performance trade-offs are specified to balance competing requirements such as detec- tion accuracy versus processing latency or coverage area versus resolution.

In a step 810, continuously process satellite sensor data at the edge for target detection. This continuous processing implements real-time analysis of incoming imagery streams without requiring data transmission to remote processing centers. Edge-based processing leverages computational resources co-located with or near the sensor platform to minimize latency between data collection and actionable intelligence. The processing pipeline operates in a streaming fashion, analyzing each image frame as it arrives while maintaining temporal context from previous frames. Resource management techniques ensure sustained process- ing rates despite variations in scene complexity or target density, implementing adaptive algorithms that adjust pro- cessing fidelity based on available computational capacity and operational priorities.

In a step 820, calculate precise surface-relative positions with geodetic transformations. This calculation converts image-space detections into accurate geographic coordinates on the Earth's surface through comprehensive geometric modeling. Geodetic transformations account for the com- plete imaging geometry including sensor position and ori- entation, Earth curvature and rotation, atmospheric refrac- tion effects, and terrain elevation where available. The positioning process propagates uncertainties through the transformation chain, quantifying location accuracy based on sensor calibration quality, ephemeris precision, and geo- metric factors. Surface-relative positioning ensures that reported locations correspond to actual ground positions rather than projected coordinates, some use cases requiring precise geographic targeting.

In a step 830, maintain persistent object tracks with temporal correlation across frames. This maintenance cre- ates continuous tracking records that follow objects through multiple observations over time. Temporal correlation links detections across frames based on motion consistency, appearance similarity, and predicted trajectories. Track state estimation, may in one embodiment, employ filtering tech- niques that optimally combine previous state estimates with new observations, smoothing noisy measurements while adapting to changing object dynamics. Persistence mecha- nisms handle temporary detection failures due to occlusion, sensor gaps, or environmental conditions, maintaining track continuity based on motion predictions until reacquisition occurs. Track quality metrics quantify reliability based on observation history, enabling appropriate handling of tenta- tive versus well-established tracks.

In a step 840, stream real-time updates to command centers while storing historical data. This streaming delivers actionable intelligence with minimal latency while simultaneously preserving comprehensive records for analysis. Real-time streaming protocols optimize for low latency and reliable delivery, implementing adaptive data rates that respond to network conditions and prioritize important updates. Message formatting balances information completeness with transmission efficiency, potentially using delta encoding to send only changes since previous updates. Historical storage captures full-fidelity tracking data including all observations, state estimates, and metadata, organizing archives for efficient retrieval based on temporal, geographic, or object-based queries. The dual-path architecture ensures that real-time operations remain responsive while maintaining complete audit trails.

In a step 850, enable authorized queries for pattern analysis and operational planning. This enablement provides controlled access to both real-time and historical tracking data for various analytical purposes. Query interfaces support complex searches based on temporal windows, geographic regions, object characteristics, and behavioral patterns. Pattern analysis capabilities identify trends such as movement corridors, activity hotspots, or anomalous behaviors that inform operational planning. Access control mechanisms ensure that users only retrieve data appropriate to their authorization level, implementing role-based permissions and audit logging. Query optimization techniques enable efficient searches across large archives while real-time query capabilities support operational decision-making based on current situations combined with historical context.

Figure 9:
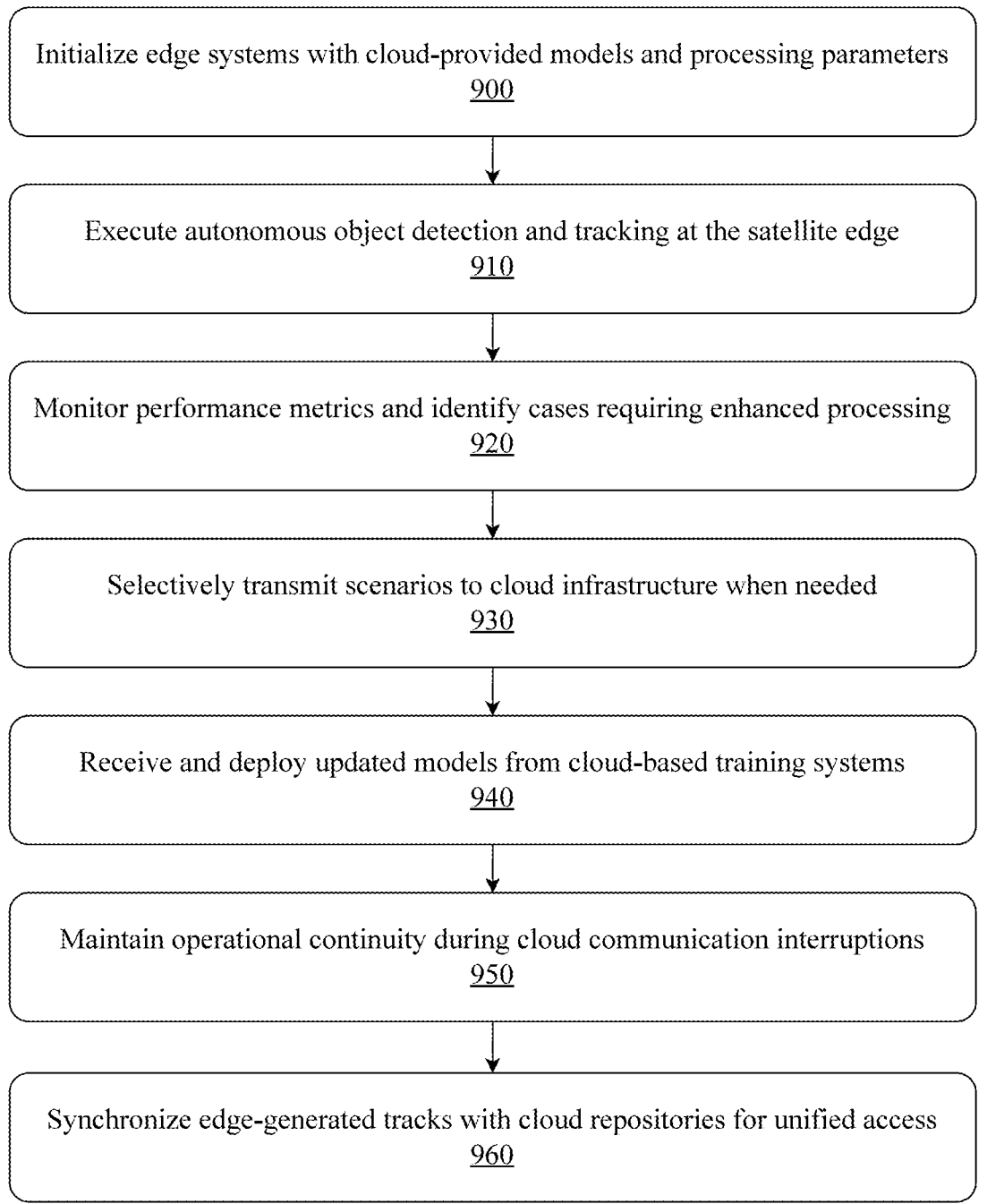
FIG. 9 is a flow diagram illustrating an exemplary method for adaptive edge processing with cloud integration for distributed object tracking operations.

FIG. 9 is a flow diagram illustrating an exemplary method for adaptive edge processing with cloud integration for distributed object tracking operations. In a first step 900, initialize edge systems with cloud-provided models and processing parameters. This initialization downloads and configures machine learning models that have been trained on comprehensive datasets using cloud-based computational resources. The cloud-provided parameters include optimized neural network weights, detection thresholds calibrated for various operational scenarios, tracking filter parameters tuned through extensive simulation, and processing configurations adapted to edge hardware capabilities. The initialization process validates model compatibility with edge hardware, performs any necessary format conversions or quantization, and establishes baseline performance benchmarks. Configuration parameters are stored locally to enable autonomous operation, with versioning mechanisms tracking model updates and enabling rollback if issues arise.

In a step 910, execute autonomous object detection and tracking at the satellite edge. This execution runs complete detection and tracking workflows using locally available computational resources without requiring cloud connectivity. Edge processing analyzes sensor data streams in real-time, applying the initialized models to detect objects and maintain tracking states. The autonomous operation includes all necessary functions from image preprocessing through track output generation, optimized for the computational constraints of edge deployment. Processing adapts to varying operational conditions such as scene complexity, target density, and available computational resources while maintaining consistent performance within design parameters.

In a step 920, monitor performance metrics and identify cases requiring enhanced processing. This monitoring continuously evaluates processing quality indicators including detection confidence scores, tracking uncertainty levels, computational resource utilization, and processing latency measurements. Performance analysis identifies scenarios that challenge edge processing capabilities, such as dense target environments exceeding tracking capacity, ambiguous detections requiring advanced classification, novel object types not well-represented in edge models, or complex scenarios benefiting from multi-source correlation. The monitoring process implements threshold-based and trend-based detection of performance degradation, distinguishing between transient issues and systematic limitations requiring cloud assistance.

In a step 930, selectively transmit scenarios to cloud infrastructure when needed. This selective transmission identifies specific data segments that would benefit from enhanced cloud processing while minimizing bandwidth usage. The transmission process packages relevant imagery, detection results, and contextual metadata for cloud analysis, implementing compression and prioritization to optimize limited communication bandwidth. Selection criteria balance the value of cloud processing against transmission costs, considering factors such as operational priority, available bandwidth, and urgency of results. The edge system continues local processing while awaiting cloud results, maintaining operational continuity and updating tracks when enhanced cloud analysis becomes available.

In a step 940, receive and deploy updated models from cloud-based training systems. This reception processes model updates generated by cloud-based training that incorporates new data, addresses identified limitations, or adapts to evolving operational requirements. The deployment process validates new models before activation, running parallel testing to ensure performance improvements without regression. Model updates are staged and activated during appropriate operational windows, with mechanisms to maintain service continuity during transitions. The update process preserves operational state across model changes, ensuring that active tracks and system context persist through updates.

In a step 950, maintain operational continuity during cloud communication interruptions. This maintenance ensures uninterrupted edge operations when cloud connectivity is unavailable due to communication failures, bandwidth constraints, or security policies. Local caching preserves recent models and parameters, enabling extended autonomous operation without cloud updates. The edge system adapts its behavior during isolation, potentially relaxing certain thresholds or expanding acceptable uncertainty bounds to maintain coverage. Buffering mechanisms queue data for eventual cloud transmission when connectivity resumes, prioritizing based on operational value and available storage. Recovery procedures automatically resynchronize with cloud services when communication is restored, uploading buffered data and downloading any missed updates.

In a step 960, synchronize edge-generated tracks with cloud repositories for unified access. This synchronization uploads locally generated tracking data to cloud storage systems that aggregate information from multiple edge nodes. The synchronization process handles various data types including real-time track updates for operational awareness, historical track archives for pattern analysis, system performance metrics for optimization, and exceptional scenarios for training set enhancement. Synchronization protocols manage bandwidth efficiently through incremental updates, compression, and scheduling during low-activity periods. The cloud repository provides unified access to distributed tracking data, enabling comprehensive analysis across multiple edge nodes while preserving the low-latency benefits of edge processing for real-time operations.

Exemplary Computing Environment

Figure 10:
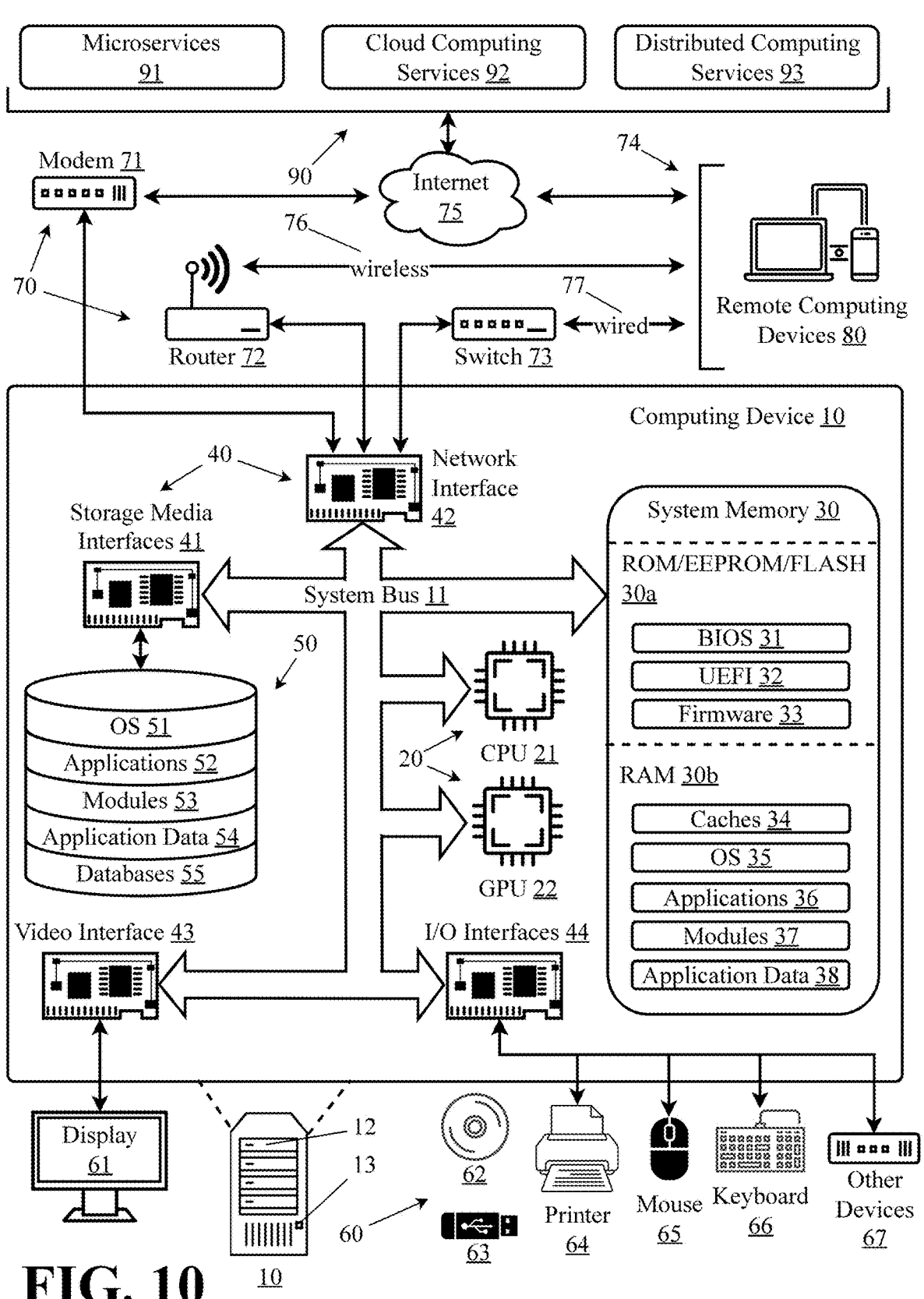
FIG. 10 illustrates an exemplary computing environment on which an embodiment described herein may be implemented, in full or in part.

FIG. 10 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising:
a hardware memory, wherein the computer system is configured to execute software instructions stored on non-transitory machine-readable storage media that:
receive sensor data from an imaging system at an edge computing platform;
process images through one or more machine learning models to detect objects within the sensor data;
transform detected objects from image coordinates to geodetic coordinates using geometric transformations;
maintain track states for the detected objects by associating detections across multiple time periods;
monitor the track states to identify tracked objects approaching a coverage boundary of the imaging system;
generate custody transfer messages for the identified objects, wherein the custody transfer messages include state information sufficient to enable continued tracking;
transmit the custody transfer messages to one or more external tracking nodes before the identified objects exit coverage;

receive incoming custody messages from the one or more external tracking nodes for objects entering coverage; and
initialize tracking of objects identified in the incoming custody messages using the received state information.

2. The system of claim 1, wherein the geometric transformations comprise homography matrices that map pixel coordinates between consecutive frames to account for satellite platform movement and sensor pointing variations.

3. The system of claim 1, wherein the custody transfer messages include kinematic state vectors, covariance matrices characterizing position uncertainties, track history summaries, and classification probabilities.

4. The system of claim 1, wherein the edge computing platform implements a message broker that orchestrates asynchronous communication between detection and tracking components using publish-subscribe messaging patterns.

5. The system of claim 1, wherein associating detections across multiple time periods employs Kalman filtering to refine position and velocity estimates based on new observations.

6. The system of claim 1, wherein monitoring track states includes calculating time-to-boundary predictions based on current positions and velocity vectors to prioritize custody transfers.

7. The system of claim 1, wherein the machine learning models are optimized for edge deployment through quantization and pruning techniques that reduce computational requirements while maintaining detection accuracy.

8. The system of claim 1, wherein the machine learning models execute on GPU processors using parallel processing.

9. The system of claim 1, wherein initializing tracking includes assigning unique track identifiers that persist across distributed nodes to prevent duplicate tracking of the same object.

10. A method for edge-deployed automated target recognition and tracking with distributed processing, comprising the steps of:
receiving sensor data from an imaging system at an edge computing platform;
processing images through one or more machine learning models to detect objects within the sensor data;
transforming detected objects from image coordinates to geodetic coordinates using geometric transformations;
maintaining track states for the detected objects by associating detections across multiple time periods;
monitoring the track states to identify tracked objects approaching a coverage boundary of the imaging system;
generating custody transfer messages for the identified objects, wherein the custody transfer messages include state information sufficient to enable continued tracking;
transmitting the custody transfer messages to one or more external tracking nodes before the identified objects exit coverage;
receiving incoming custody messages from the one or more external tracking nodes for objects entering coverage; and
initializing tracking of objects identified in the incoming custody messages using the received state information.

11. The method of claim 10, wherein the geometric transformations comprise homography matrices that map pixel coordinates between consecutive frames to account for satellite platform movement and sensor pointing variations.

12. The method of claim 10, wherein the custody transfer messages include kinematic state vectors, covariance matrices characterizing position uncertainties, track history summaries, and classification probabilities.

13. The method of claim 10, wherein processing images through machine learning models includes implementing a message broker that orchestrates asynchronous communication between detection and tracking components using publish-subscribe messaging patterns.

14. The method of claim 10, wherein associating detections across multiple time periods employs Kalman filtering to refine position and velocity estimates based on new observations.

15. The method of claim 10, wherein monitoring track states includes calculating time-to-boundary predictions based on current positions and velocity vectors to prioritize custody transfers.

16. The method of claim 10, wherein the machine learning models are optimized for edge deployment through quantization and pruning techniques that reduce computational requirements while maintaining detection accuracy.

17. The method of claim 10, wherein the state information in custody messages is extrapolated to common reference times to ensure smooth handoffs between nodes with varying processing latencies.

18. The method of claim 10, wherein initializing tracking includes assigning unique track identifiers that persist across distributed nodes to prevent duplicate tracking of the same object.

19. The method of claim 10, wherein the machine learning models execute on GPU processors using parallel processing.

20. The method of claim 10, wherein transforming detected objects to geodetic coordinates accounts for terrain elevation data when available to improve localization accuracy.

* * * * *